Jan. 28, 1958     H. SHAPIRO     2,821,673
A. C. MOTOR
Filed Dec. 31, 1956
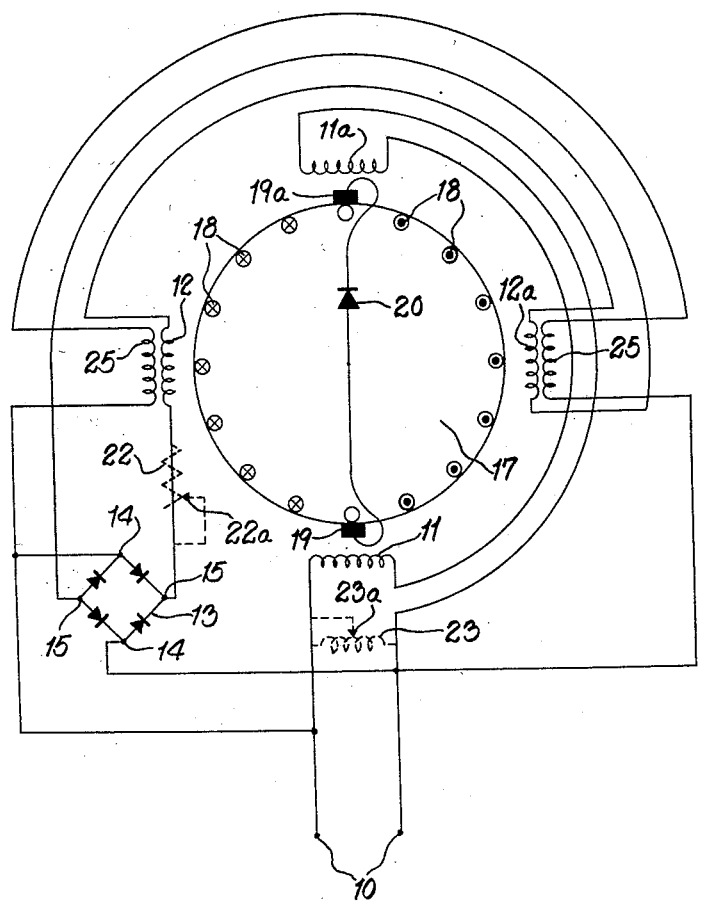
INVENTOR.
HARRIS SHAPIRO
BY Davis, Hoxie & Faithfull
ATTORNEYS

United States Patent Office 2,821,673
Patented Jan. 28, 1958

2,821,673
A. C. MOTOR

Harris Shapiro, Oradell, N. J., assignor, by mesne assignments, to Safety Industries, Inc., Hamden, Conn., a corporation of Delaware Application December 31, 1956, Serial No. 631,799

7 Claims. (Cl. 318—194)

This invention relates to electric motors and has particular reference to a motor operable from an A. C. current source but having properties of a D. C. motor.

While electric motors of the repulsion type are considerably less expensive to manufacture than D. C. motors, they have serious disadvantages which restrict their use. They do not afford the possibilities for speed regulation as in a D. C. motor. Moreover, as the speed of a repulsion motor is reduced, there is an increase in the transformer voltage induced in the coil undergoing commutation by the alternating main field flux, and this increase causes serious sparking. Thus, commutation places a severe limitation upon the practical speed range which can be obtained with repulsion motors.

The principal object of the present invention is to provide an A. C. motor which can be manufactured at a cost comparable with that of a repulsion motor and yet has the superior performance characteristics of a D. C. motor.

A motor made in accordance with the invention has terminals adapted for connection to an A. C. current source, and two stator windings connected to these terminals. One of these windings is a power winding and is connected across the terminals so as to supply the load power from the A. C. current source by induction. The other stator winding is a field winding and is fed from the terminals through a full-wave rectifier. This field winding may be a low power winding which serves only for excitation purposes. A wound armature is rotatably mounted within the fields of the stator windings and is commutated through brushes, which are preferably positioned to align the axis of the armature M. M. F. (magnetomotive force) with the axis of the power winding of the stator. A one-half wave rectifier is connected across these brushes which engage the armature commutator.

With this construction, the stator power winding and the wound armature correspond respectively to the primary and secondary of a transformer having the one-half wave rectifier as a load. In the operation of the motor, an E. M. F. of line frequency is induced across the brushes; but the armature winding can conduct only over a half cycle due to the one-half wave rectifier connected across the brushes, so that no reversal of current can take place in the armature. Thus, this last rectifier serves to cancel out the negative half of the torque cycle which is normally associated with an induced alternating current E. M. F. Torque will be developed as in a D. C. motor, and the motor will speed up at no load to the point where the average value of the conducting one-half cycle of induced E. M. F. is exactly opposed (except for the effect of no-load losses) by the speed voltage (B. L. V.) of the main field winding. As load is applied, the motor will slow down to allow for the stator reactance and armature resistance drop, and the motor will exhibit a speed regulation similar to that of a D. C. shunt motor.

To control the speed of the motor, I provide means for varying the field strength of either the stator power winding or the stator field winding, or both. Such means may comprise a variable resistance in circuit with the stator field winding, or an auto-transformer associated with the power winding and having an adjustable contact for varying the excitation of this winding.

For a better understanding of the invention, reference may be had to the accompanying drawing in which the single illustration is a schematic view of a preferred form of the new motor, shown as a two-pole motor.

The motor as illustrated comprises terminals 10 adapted to be connected across a single phase power line. The stator (not shown) is a standard induction motor stator having two windings in quadrature. More particularly, the motor comprises a stator winding 11—11a which serves as the power winding and is connected directly across the terminals 10, so that this winding supplies the load power from the A. C. current line, via the terminals 10, by induction. The other stator winding 12—12a is a field winding and is a low power winding which serves only for excitation purposes. The field winding 12—12a is energized from a full-wave rectifier 13 having input terminals 14 connected across the motor terminals 10, the field winding 12—12a being connected across the output terminals 15 of the rectifier. Thus, the field winding 12—12a is energized with direct current.

The stator windings 11—11a and 12—12a are disposed about an armtaure 17 which is mounted for rotation in any suitable manner. The armature 17 carries a winding 18 forming a coil on the armature. The armature winding 18 is adapted to be commutated through stationary brushes 19—19a engaging the usual commutator (not shown) mounted on the armature and connected to the turns of the winding 18. A half-wave rectifier 20 is connected across the commutator brushes 19 and 19a. As shown in the drawing, the axis of the brushes 19—19a is set so that the axis of the armature M. M. F. is in line with the axis of the power winding 11—11a. Thus, the latter winding and the armature winding 18 are in effect the primary and secondary, respectively, of a transformer having a half-wave rectifier 20 as a load.

It will be apparent that an E. M. F. of line frequency is induced across the brushes 19—19a in the operation of the motor, due to the transformer action previously described. However, the half-wave rectifier 20 allows the armature winding 18 to conduct only over a half-cycle and prevents any reversal of current in the armature. In other words, the half-wave rectifier 20 functions to cancel out the negative half of the torque cycle which is normally associated with an induced alternating current E. M. F. The motor torque will be developed in accordance with the fundamental D. C. motor equation $T = K\phi I_{av}$. At no-load, the motor will speed up to the point where the average value of the conducting one-half cycle of induced E. M. F. is exactly opposed by the speed voltage (B. L. V.) of the main field winding 12—12a, except for the effect of no-load losses. Upon application of a load to the motor, it will slow down to accommodate the stator reactance and armature resistance drop, and the speed regulation to the motor will be similar to that of the D. C. shunt motor.

The speed of the motor is controlled by means for varying the field strength of one of the stator windings 11—11a and 12—12a. Such means may comprise a variable resistor 22 in circuit with the field winding 12—12a, this resistor having an adjustable contact 22a. Alternatively, such means may comprise an auto-transformer 23 connected across the motor terminals 10 and having an adjustable contact 23a for varying the field strength of the power winding 11—11a. By adjusting the strength of the main field through the variable resistor 22, or by "armature control" of the power winding 11—11a through the auto-transformer 23, the motor speed can be adjusted as desired.

In the new motor as illustrated and described above, the main field is a D. C. field produced by the stator winding 12—12a and thus induces no transformer voltage in the coil 18 undergoing commutation. Consequently, the factor of serious sparking in commutating is removed as a restriction on the speed regulation of the motor.

There are two voltages which are commutated in the new motor. One is the normal E. M. F. of self-induction due to current reversal in the coil undergoing commutation. The second is the speed voltage induced from the flux produced by the power winding 11—11a. (Variations in the power field do not induce a voltage in the coil undergoing commutation because the plane of this coil is in the plane of the varying power field, and the latter field does not link the commutated coil.) Since the armature winding 18 and the half-wave rectifier 20 act as a transformer secondary and load, this rectifier can be mounted on the motor and the armature can be wound for very low voltage, with all the inherent commutation advantages of low voltage operation; and yet none of the usual disadvantages of low voltage operation is incurred. When operating from an A. C. source to a D. C. motor, these disadvantages include the need for an additional expensive high-turns-ratio, low-voltage-output transformer, with the attendant heavy cable problems of running from the transformer through the rectifier to the motor. The present motor acts as the low voltage transformer, and the supply is any available A. C. current source. The use of the low voltage armature eliminates commutation difficulties due to the E. M. F. of self-induction.

When a high-rating motor made in accordance with the present invention is operated at high speeds, the speed voltage induced by the field from the power winding 11—11a may cause some commutating difficulty. However, in such instances, this voltage may be commutated by winding an A. C. commutating winding 25 on the same axis as the main field from the winding 12—12a. As shown, the winding 25 is connected directly across the A. C. power line, and its strength varies with applied voltage and speed. Since the speed voltage is in time phase with the flux producing it, and the transformer voltage is in time quadrature with the flux producing it, the two voltages can be made to cancel each other exactly at high speed (the synchronous speed as in an A. C. motor). Since the speed voltage is a function of line voltage only, the voltage applied to this commutating winding can be reduced as the speed is reduced. At low speeds (compared to A. C. synchronous speed), the two voltages are far apart in frequency, and the commutating field loses most of its effect. However, at low speeds, the speed voltage to be commutated is low, so that an effective commutation field is unnecessary. Consequently, the new motor can be made to commutate almost as well as an interpole D. C. motor.

As the armature 17 is wound for low voltage, the half-wave rectifier 20 connected across the brushes is a low-voltage, high-current rectifier. This is in contrast to the rectifier which would be used with a D. C. motor from a normal A. C. line, which would be a high-voltage, low-current rectifier. The low-voltage rectifier has fewer plates of larger area than the high-voltage rectifier and, therefore, is less costly.

I claim:

1. An A. C. motor comprising terminals adapted for connection to an A. C. current source, a stator power winding connected across said terminals, a stator field winding, a rectifier connecting said last winding across the terminals for supplying D. C. current to said field winding, a wound armature disposed within the fields of said stator windings, brushes engaging the armature for commutating the voltages induced in the armature winding by said fields, and a one-half wave rectifier connected across said brushes to prevent reversal of current in the armature winding.

2. An A. C. motor according to claim 1, in which said first rectifier is a full-wave rectifier.

3. An A. C. motor according to claim 1, in which said stator windings are disposed about the armature on different axes, the brushes being postioned to align the axis of the armature magnetomotive force with the axis of the power winding.

4. An A. C. motor according to claim 1, in which said power winding and armature winding correspond to the primary and secondary, respectively, of a transformer having said one-half wave rectifier as a load.

5. An A. C. motor according to claim 1, comprising also means for varying the field strength of one of said stator windings, to control the motor speed.

6. An A. C. motor according to claim 1, comprising also a variable resistance in circuit with the stator field winding for controlling the motor speed.

7. An A. C. motor according to claim 1, comprising also an auto-transformer connected across said terminals and having an adjustable contact for controlling the motor speed.

No references cited.